United States Patent [19]

Barber

[11] 3,811,012

[45] May 14, 1974

[54] REMOTE TELEPHONE CALLING SYSTEM

[76] Inventor: Alfred W. Barber, 32-44 Francis Lewis Blvd., Bayside, N.Y. 11358

[22] Filed: Dec. 5, 1969

[21] Appl. No.: 882,484

[52] U.S. Cl. ................ 179/2 A, 179/2 C, 179/2 E, 179/6 E

[51] Int. Cl. ........................................ H04m 11/10

[58] Field of Search ........... 179/2 R, 2 A, 2 C, 2 E, 179/1 C, 41 A, 84 R, 84 L, 6 E, 6 R; 340/311, 312

[56] References Cited

UNITED STATES PATENTS

| | | | |
|---|---|---|---|
| 3,476,882 | 11/1969 | Vogelman | 179/1 C |
| 3,445,600 | 5/1969 | Todd | 179/6 R |
| 3,485,952 | 12/1969 | Walker | 179/2 A |
| 3,376,506 | 4/1968 | Sontag | 340/311 |
| 3,478,344 | 11/1969 | Schwitzgebel | 340/311 |

*Primary Examiner*—Ralph D. Blakeslee

[57] ABSTRACT

A telephone calling system provides in response to received ringing pulses; (1) circuit closure disabling the ringing circuit and enabling the voice communication circuit; (2) turns on an answering device which transmits "you have reached the phone of Mr. Smith. I am in the back yard. Please hold the line until I can get to the phone"; (3) sends out a signal to activate a remote signaling device, and; (4) a remote wrist radio device provides an audible, visible and/or other signal indicating that a call has come in on the telephone circuit.

The standard telephone provides an audible signal in the form of a bell which is energized by pulsing current over the line to indicate an incoming call. In case it is undesirable to have an audible signal, a visible signal in the form of a blinking lamp may be substituted. Whenever an individual on the receiving end is within range of these signals, there is no particular problem. However, the ranges of these audible and/or visible signals are definitely limited. There are many and growing situations where the intended recipient is out of range of the signal or signals. Examples are when one is in another part of a large rambling house, outside, in another room with the door closed, in a neighbor's back yard, and any number of other possible situations.

10 Claims, 3 Drawing Figures

INVENTOR.
ALFRED W. BARBER
BY Alfred W. Barber

INVENTOR.
ALFRED W. BARBER
BY
Alfred W. Barber

REMOTE TELEPHONE CALLING SYSTEM

SUMMARY

In accordance with the present invention, a telephone answering and signaling system is provided adapted to audibly and/or visually signal those out of range of the standard telephone bell. The telephone circuit in ringing mode transmits a series of low frequency ringing signal which are applied through a capacitor to a bell circuit energizing the bell. In my present system I apply this signal to a rectifier and in turn to the gate of a silicon controlled rectifier (relay or other signal sensitive circuit closing device). Upon closing of the signal sensitive circuit closing device two circuits are activated. One is a message device such as a tape player which, upon activation, transmits a predetermined message to the telephone line. A typical message is, "You have reached the telephone of Mr. Smith. I am away from the phone at the moment. Please hold the line until I can return." The other is a remote signaling device such as a tone modulated radio frequency generator. The remote signaling is intended to activate a remote receiving device within audible and/or visual range of the person called. At a remote point a radio receiver is provided with audible and/or visual output responsive to the radio frequency transmission initiated at the telephone station. The radio receiver is preferably a simple fixed tuned receiver with a loudspeaker output and/or a lamp energized in response to received signals. A typical lamp circuit comprises a coupling to the primary of the output transformer with a rectifier providing dc in response to received signals. The dc is applied to the base of a transistor while the lamp is connected in series with the transistor collector. The loud speaker of the radio receiver yields an audio signal so that both audible and visible signals are produced.

Upon receiving the audio and/or visual signal indicating an incoming telephone call, the person called goes to the telephone, lifts the handset and replies in a normal manner. The lifting of the handset deactivates the calling circuit and resets it in readiness for the next incoming call. In order to insure resetting of the remote calling circuits, a push-button switch for opening the holding circuit is provided or a timer is provided to open the circuit if no answer is made in a predetermined time after the call comes in.

Figure 1:
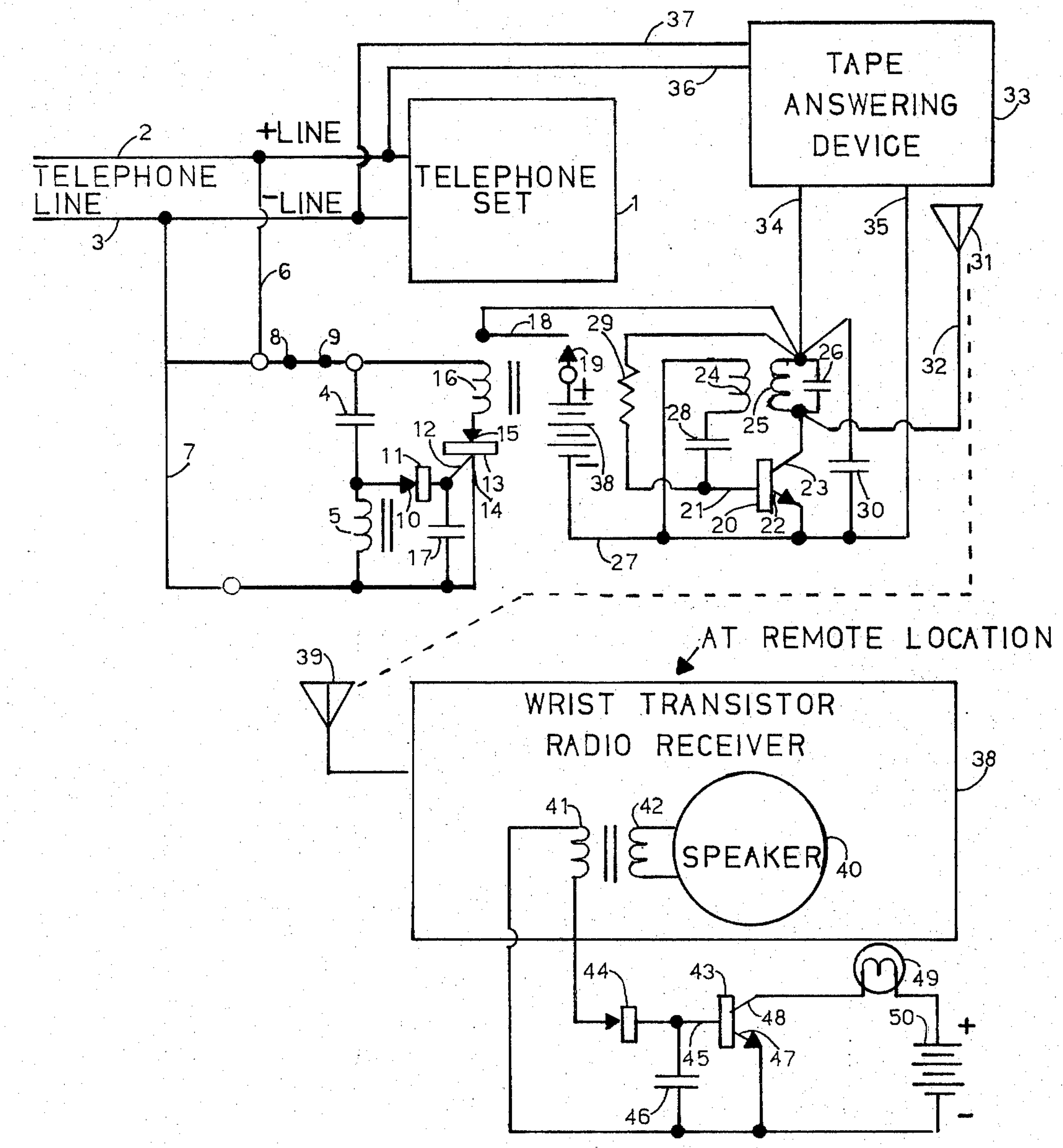
FIG. 1 is the circuit diagram of a preferred form of the invention including local calling apparatus and a remote receiving station.

FIG. 1 shows a standard telephone set 1 connected to incoming positive and negative telephone lines 2 and 3 respectively. Across these lines is connected a ringing current responsive circuit including capacitor 4 in series with inductor connected across the lines by leads 6 and 7 respectively. A push-button reset switch 8 – 9 is connected in series with lead 6. The ringing current is applied through unidirectionalizing rectifier 10 – 11 to gate 12 of silicon controlled rectifier 13. Cathode 14 is returned to lead 7 which in turn connects to the negative telephone line 3. Anode 15 is connected through relay coil 16, reset switch 8 – 9 and lead 6 to positive telephone line 2. A gate voltage delay capacitor 17 is connected between gate 12 and cathode 14 of silicon controlled rectifier 13. Relay coil 16, when activated, closes relay contacts 18 and 19 completing the energizing circuit to a modulated oscillator including transistor 20. The modulated oscillator is provided to transmit a signal to a remote point indicating that a call has come in on the telephone line. The particular modulator to be described is a blocking oscillator for reasons of simplicity but the invention not limited to the particular form of remote point signaling device. Transistor 20 includes base 21, emitter 22 and collector 23. Transistor 20 is connected to a blocking oscillator circuit including radio frequency transformer 24 – 25 with tuning capacitor 26 connected across winding 25. Plate coil 25 tuned by capacitor 26 is connected between collector 23 and switch contact 18 which, upon energizing of relay coil 16, applies collector bias to transistor 20. Feedback winding 24 is connected between common lead 27 and through base coupling capacitor 28 to base 21. Bias is applied to base 21 by means of resistor 29. The collector voltage is bypassed by capacitor 30. Modulated signals generated by the circuit just described are radiated by an antenna 31 connected to collector 23 over lead 32. An additional part of the system at the input end is tape answering device 33 energized over leads 34 – 35 by the closure of switch 18 – 19 and designed to transmit an answering message to the telephone leads. The output is coupled to telephone leads 2 and 3 over leads 36 and 37 respectively.

The system described above functions in the following manner. When a telephone ringing signal is received across the telephone lines 2 – 3, a pulsating signal is applied through capacitor 4 across inductor 5 which being rectified by rectifier 10 – 11 applies positive pulses to gate 12 of silicon controlled rectifier 13. The circuit of SCR13 is completed from cathode 14 to negative line 3 and from anode 15 through relay coil 16 to positive line 2. Capacitor 17 serves to delay and store pulses at gate 11 until SCR13 fires. When SCR13 fires, it effectively connects relay coil 16 across the telephone line and the resulting dc current flow closes contacts 18 – 19. Also the low impedance shunt provided by relay coil 16 turns off the telephone ringing pulses and signals the calling party that the call has been answered. The closing of switch 18 – 19 applies voltage from a voltage source such as battery 38 over leads 34, 27 and 35 to a tape recorder answering device 33 activating it to reproduce a message to the telephone lines over leads 36 and 37. An appropriate message would be "you have reached the telephone of Alfred Barber. I am out in the back yard but have received your call and will be right in. Please hold the line." The voltage from battery 38 is also applied to the modulated oscillator described above employing transistor 20 and a modulated radio frequency signal is radiated from antenna 31 to signal that a call has come in on the telephone.

Turning now to the remote signal receiving system, a miniature transistorized receiver 38 having antenna means 39 receives the radiated modulated signal and emits an audible signal as by means of loud speaker 40 coupled by means of the radio receiver output transformer 41–42. Across one winding of the output transformer 41 is also coupled a visual signaling means comprising transistor 43 receiving a turn-on bias through rectifier 44, connected to base 45 across filter capacitor 46. When an auduble signal is received and thus rectified, transistor 43 conducts between emitter 47 and collector 48 permitting current to flow from battery 50 through lamp 49 providing a visual indication. Thus, the remote point receiving system provides both an audible and a visual signal indicating that a call has come in on the local telephone line.

When a person is alerted by the remote audible/-visual signal and goes to the phone, lifting the handset shunts the telephone line with a low impedance resetting the remote signaling system to its initial condition. If desired to insure the resetting, push-button switch 8–9 may be opened momentarily.

Figure 2:
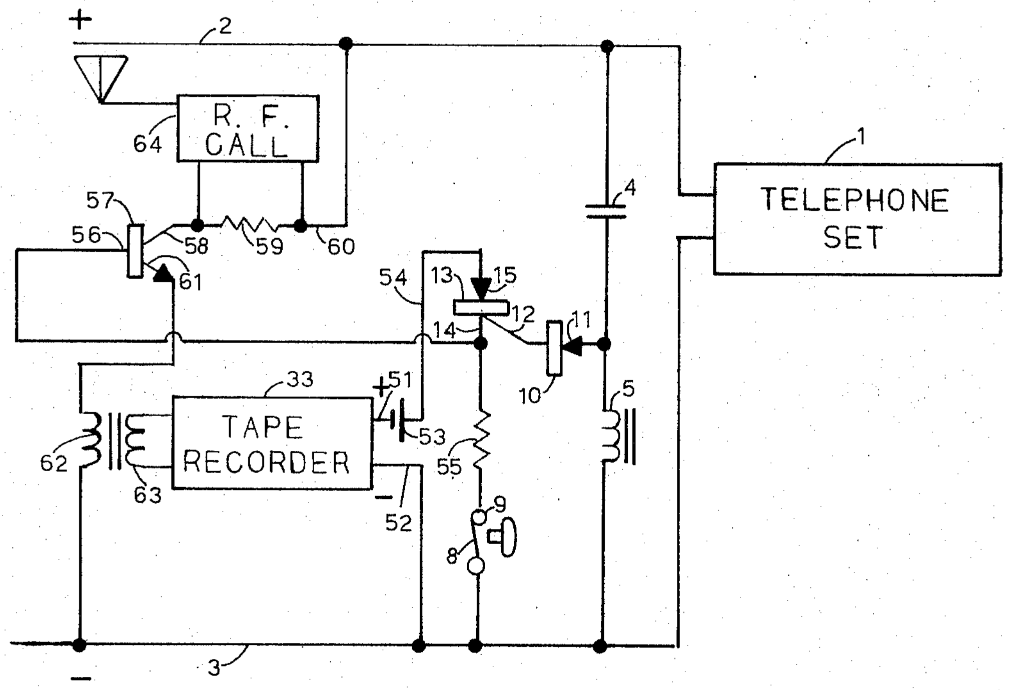
FIGS. 2 and 3 are modified forms of the calling apparatus.

In FIG. 2 parts similar to those shown and described in FIG. 1 bear the same numerals. However, the circuit of FIG. 2 is somewhat modified and is all solid state. The tape recorder is turned on by silicon controlled rectifier 13 over leads 51-52-54. This circuit is connected to the tape recorder remote control circuit and being in series with the tape recorder power carries a positive dc voltage on lead 51 and a negative dc voltage on lead 52. This voltage appears across the silicon controlled rectifier 13 so that when a ringing signal appears on the telephone lines 2 and 3 and silicon controlled rectifier 13 is switched on, this voltage supplies a holding current and the tape recorder is turned on. A small resistor 55 in series with cathode 14 provides a voltage drop which is applied to base 56 of transistor 57 causing it to conduct, collector 58 is connected through resistor 59 and over lead 60 to the positive telephone line 2. Emitter 61 is connected through secondary 62 of transformer 62 – 63 to negative telephone 3. Thus, when transistor 57 is made conducting in response to the telephone ringing signal, an impedance is placed across the telephone line comprising resistor 59, transistor collector to emitter impedance and secondary 62 in series. This circuit should be designed to place an impedance of the order of 300 ohms across the telephone line which is a suitable impedance for causing the telephone ringing signal to be suspended and the voice circuit to the calling party established. The tape recorder has been started as described above and the voice circuit established and now the recorded message is played through transformer 62 – 63 into the telephone line through transistor 57 and resistor 59. At the same time a dc voltage drop derived from the dc on the telephone line will appear across resistor 59 to activate the remote calling device 64 as described in FIG. 1. Since there will be a small voltage drop across silicon controlled rectifier 13 and resistor 55 which reduces the tape recorder energizing voltage, a battery 53 is added in series connected to aid the recorder voltage source to compensate this drop.

Figure 3:
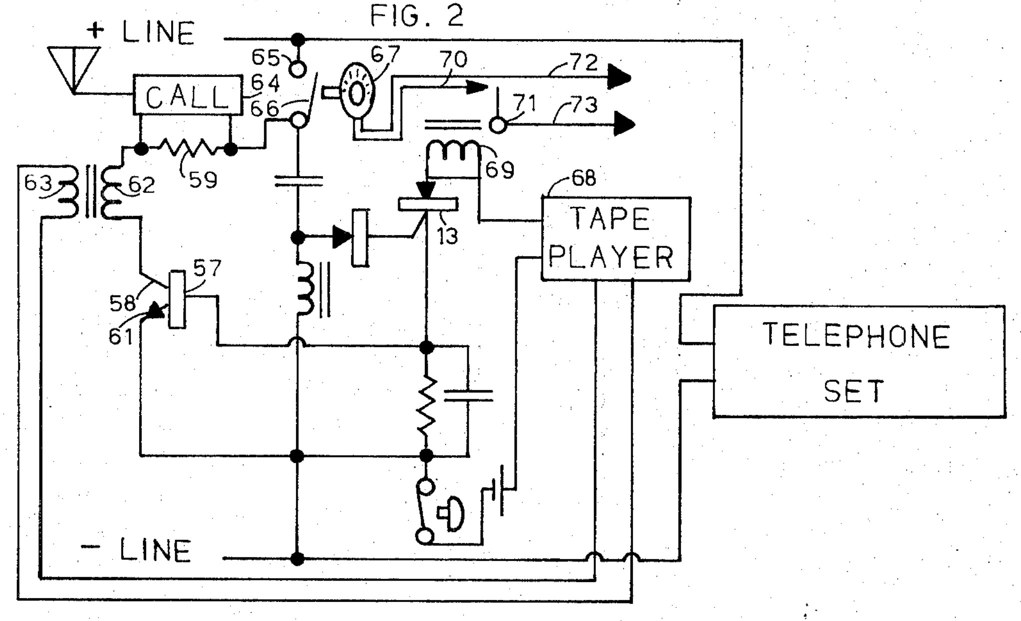

FIG. 3 is a further modification of my telephone remote calling system in most respects and in basic operation similar to the forms shown in FIGS. 1 and 2 and described in detail above. In FIG. 3, however, the voice circuit from tape player 68 coupled through transformer 62–63 is connected in series with collector 58 of transistor 57 and resistor 59. Since it is generally intended to use a prerecorded message in answering, only a tape player 68 is required in the system. While I prefer the coupling of the voice circuit in series with the transistor collector 58 as shown, the system may be operated successfully with other modes of coupling to the telephone line. FIG. 3 also provides a timer 67 which closes the circuit to the remote calling system through switch contacts 65–66. This timer may be set by rotation to close contacts 65–66 with a predetermined off time selected. When the telephone call is received relay coil 69 is energized by the firing of the silicon controlled rectifier 13 closing contacts 70–71 and applying power from a suitable source supplied over leads 72–73 to activate timer 67. Timer 67 will then start to run and will open the circuit over switch 65–66 at the end of the predetermined set time. This provision is made so that if the telephone is not answered in a predetermined time, say 5 minutes, the circuit will be disconnected. If this provision were not made, the remote calling system could tie up the telephone line for an indefinite period and the tape player would continue to run. It is assumed that if the telephone is not answered in a reasonable time that it is desirable to disconnect the system from the line.

I claim:

1. In a remote telephone calling system, the combination of; means for closing a circuit in response to a telephone ringing signal;

means for connecting a line seizing load through said circuit closing means to a telephone line;

a message playing device coupled to said circuit closing means and including voice signal output means;

a means for coupling said voice signal output means to said telephone line to repeat a predetermined message into said line;

remote calling means energizable in response to said circuit closing means;

and coupling means between said circuit closing means and said remote calling means for energizing said remote calling means in response to the presence of a telephone ringing signal on said telephone line.

2. A remote telephone calling system as set forth in claim 1; wherein said remote calling means comprises a tone modulated radio frequency signal generator coupled to radio frequency antenna means.

3. A remote telephone calling system as set forth in claim 1; and including remote receiving means responsive to said remote calling means.

4. A remote telephone calling system as set forth in claim 1; wherein said telephone line connecting means includes a timer operated switch for opening said connection to said telephone line.

5. A remote telephone calling system as set forth in claim 1;

wherein said circuit closing means is a silicon controlled rectifier coupled to said telephone line.

6. A remote telephone calling system as set forth in claim 5;

wherein said remote calling means is coupled by a transistor activated in response to the firing of said silicon controlled rectifier.

7. A remote telephone calling system as set forth in claim 3;

wherein said remote receiving means includes an indicator lamp responsive to signals from said remote calling means

8. In a remote telephone calling system, the combination of;

means responsive to a telephone ringing signal for repeating a predetermined message into a telephone line;

means coupled to said responsive means for emitting an inaudible signal;

and means at a distance responsive to said inaudible signal.

9. A remote telephone calling system as set forth in claim 8;

wherein said means at a distance is adapted to provide a visible signal in response to said inaudible signal.

10. A remote telephone calling system as set forth in claim 8;

wherein said means at a distance is adapted to provide an audible and a visible signal in response to said inaudible signal.

* * * * *